April 10, 1934.  G. A. BIGGS  1,954,192
VALVE
Filed July 31, 1931
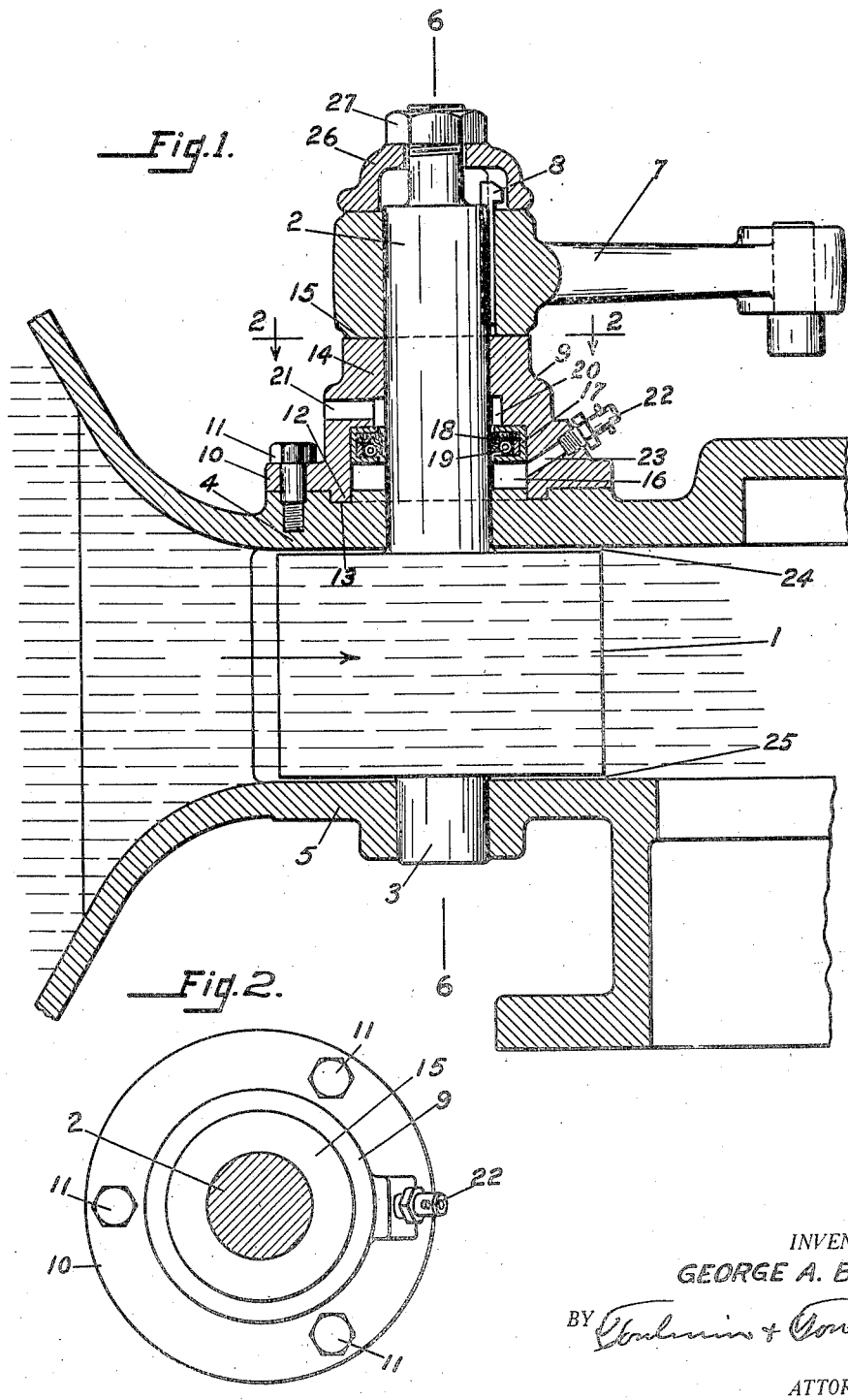
INVENTOR.
GEORGE A. BIGGS.
BY
ATTORNEYS.

Patented Apr. 10, 1934

1,954,192

UNITED STATES PATENT OFFICE 1,954,192

VALVE

George A. Biggs, Springfield, Ohio, assignor to The James Leffel and Company, Springfield, Ohio, a corporation of Ohio Application July 31, 1931, Serial No. 554,215

17 Claims. (Cl. 251—103)

This invention relates to improvements in bearings for valves to be used in connection with fluid turbines and pumps.

It is an object of this invention to provide, in connection with a valve stem, a bearing therefor which will avoid the use of packing and glands around the stem to prevent leakage.

It is also an object of this invention to provide a bearing for the valve stem which will permit the use of a short stem with the same amount of firmness and strength, and will be sufficient for operating the valve in the turbine.

It is also an object of this invention to reduce the length of the valve stem by providing a bearing of the type herein described, at the same time maintaining sufficient strength for operating the valve.

It is also an object of this invention to provide, in connection with a valve stem, a lever arm closely connected to the valve and supported by a collar that will adjust the valve with relation to the walls of the passage in which the valve is located, and maintain the valve in proper spaced relation to the walls.

It is a further object of this invention to provide, in connection with a bearing, a chamber for housing a retainer that will prevent the passage of water along the stem to the bearing proper. This housing is also provided with an inlet for grease or some heavy material that will aid the retainer in preventing the flow of water along the valve stem. This housing is also provided with an outlet through which any water may pass that escapes by the retainer and the grease so that the operator may know that the bearing needs a new retainer or a new supply of grease in the chamber therein.

These and other advantages will appear from the following description, taken in connection with the drawing.

Thus the advantages of my construction result in the elimination of a packing box and gland around the valve stem to prevent leakage of fluid; materially reduce the length of the valve stem, due to the length formerly required for accommodating the packing box; eliminate the setting of the lever arm too high for the best economy of construction; eliminate the difficulties of aligning and maintaining alignment of the valve stem bearings, and reduce the length of the stem, thereby eliminating the warping, twisting and malalignment of the stem which has heretofore been a great difficulty in constructions of this character due to the large forces employed at opposite ends of the stem.

Referring to the drawing:

Figure 1 is a vertical, longitudinal section through a passageway, with a valve therein and a stem extending therefrom together with a section of the bearing supporting the stem.

Figure 2 is a section on the line 2—2 of Figure 1.

While the present bearing structure is adapted to be used with various kinds of gate and gate stems, it is shown in connection with one of the valves used in connection with a turbine. The valve is indicated by the numeral 1, and is located in a passageway adapted to be closed or regulated by proper positioning of the valve. Extending upwardly from the valve is a top stem 2, while there is extending downwardly from the valve a bottom stem 3. The top stem is rotatably mounted in a top plate 4, while the bottom stem is rotatably mounted in a bottom plate 5. These plates form respectively the top and bottom of the passageway in which the valve is located.

The axis of the valve is indicated by the numeral 6—6. On the upper end of the stem a lever 7 is located for rotating the valve and the stem. This lever is attached to the stem by means of a key 8 and rests upon a bearing 9 positioned upon the top plate 4. The lower part of the bearing has an outwardly extending flange 10, by which it is attached to the top plate by means of screws 11. The upper part of the bearing is provided with a hole through which the valve stem passes, and into which it closely fits for bearing purposes.

Below this bearing part of the bearing the bearing is provided with a hollowed out part forming a chamber. Around this chamber the bearing has an annular projection 12 which fits into a similarly disposed annular groove 13 formed in the top plate 4. That part of the bearing through which the shaft extends and with which it closely engages is indicated by the numeral 14 and may be called a bearing support. The top part of the bearing upon which the under surface of the lever rests is called also a bearing support and is indicated by the numeral 15. This bearing support supports the lever on top of the bearing and is used for the purpose of adjusting the valve with relation to the bottom and top plates.

In the lower part of the bearing there is provided a large space or chamber 16 in which grease or some other similar substance may be placed for preventing the passage of water along the valve stem to the bearing support 14. In the upper part of the chamber 16 is a retainer ring 17. This ring is U-shaped with the open part adjacent the stem while the closed part closely fits the walls of the chamber 16. In this retainer is a leather packing 18, which is held therein by means of a spring 19.

Immediately above the chamber 16 is a reduced space or drain chamber 20, from which an outlet hole 21 extends. In order to provide the chamber 16 with grease or some similar substance, a fitting 22 is provided through which grease may be injected into the chamber. This fitting is placed in an inlet 23 provided for that purpose.

On top of the lever 7 and suitably held on the end of the valve stem is a collar 26 held on the stem by means of a nut 27. By adjusting the nut the clearances or spaces between the valve gate and the bottom and top plates may be regulated. The upper clearance is indicated by the numeral 24 while the lower clearance is indicated by the numeral 25. By adjusting the nut the position of the lever on the stem may be regulated and thereby the space between the valve and the bottom and top plates may be regulated and determined. By tightening the nut 27 the stem is pulled up, thereby raising the valve toward the top plate 4. In the event that it is necessary to lower the plate this nut is released so that the valve stem drops, carrying with it the plate, thereby varying the spaces between the valve and the top plate and the bottom plate.

When the parts are in the position shown in Figure 1, if any water should pass between the top plate 4 and the stem and valve into the chamber 16 the grease therein will prevent the further movement of the water along the stem, or at least will retard and substantially prevent it. To assist the grease, the packing and the carrier are provided. In the event that the leather in the packing should become worn and for any reason water be permitted to pass by the packing into the space or chamber 20, the water will pass from this chamber by means of the outlet 21. The operator seeing the water passing from this outlet will know immediately that the packing needs repair.

I desire to comprehend within my invention such modifications as may be embraced within my claims and the scope of my invention.

Having thus fully described my invention, what I claim as new and desire to secure by Letters Patent, is:

1. In a valve structure, in combination with a case having walls forming a passageway, a valve in said passageway having a stem projecting through one wall, said wall having an annular groove around the stem, a bearing member having a lubricant chamber and a drain chamber around the stem, said bearing member having an annular projection fitting in the annular groove on the wall, and a retainer in the lubricant chamber adjacent the drain chamber.

2. In a valve structure, in combination with a case having walls forming a passageway, a valve in said passageway having a stem projecting through one wall, said wall having an annular groove around the stem, a bearing member around the stem, said bearing member having an annular projection fitting in said groove, and a grease chamber, and a drain chamber, and a sealing member in the grease chamber adjacent the drain chamber.

3. In a valve structure, in combination with a case having walls forming a passageway, a valve in said passageway having a stem projecting through one wall and a bearing for said stem attached to said wall, said bearing consisting of a member having a chamber for containing grease, a retainer in said chamber having a packing therein and a drain outlet from the chamber, whereby water passing from the passageway around the stem cannot reach the bearing surface of the bearing.

4. In a valve structure, a valve stem, a bearing member for said stem, said bearing member having a chamber, and means in the chamber to prevent the passing of fluid along the stem and reaching the bearing, said means including means to drain the fluid in the chamber away from the bearing.

5. In a valve structure, a valve stem, a bearing member for said stem, said bearing member having a chamber at one end and a bearing at the other end, and means in the chamber to prevent the passing of fluid along the stem to the bearing, said means including means to drain the fluid in the chamber away from the bearing.

6. In a valve structure, a valve stem, a bearing member for said stem, said bearing member having at one end a retainer chamber, at the other end a bearing and intermediate the retainer chamber and the bearing a drain chamber, and means in the retainer chamber to arrest the flow of a liquid around the stem to the bearing, said means including means connected to the drain chamber to remove accumulated fluid therefrom, whereby the fluid does not reach the bearing.

7. In a valve structure, in combination with a fluid passageway, a valve in said passageway, a stem on said valve, a bearing member for said stem adjacent the passageway, a bearing member more remote from the passageway, said second bearing member having a grease chamber adjacent the passageway, a grease inlet to the chamber, a retainer in the chamber between the bearing members, and a drain outlet adjacent the second bearing member.

8. A bearing support for a valve stem consisting of a member having a lubricant chamber and a drain chamber at one end, a bearing at the other end, a retainer between the chambers, and a grease inlet to the lubricant chamber.

9. A bearing support for a valve stem consisting of a member having a chamber at one end, a bearing at the other end, a grease inlet to the chamber, a drain outlet from the chamber adjacent the bearing, and a retainer between the inlet and the outlet.

10. A bearing support for a valve stem consisting of a member having a chamber at one end, a bearing at the other end, a retainer in the chamber, a grease inlet to the chamber, and a drain outlet from the chamber.

11. A bearing support for a valve stem consisting of a member having a chamber, a bearing, a grease inlet to the chamber, a drain outlet from the chamber, and a retainer around the stem between the inlet and the outlet.

12. A bearing support for a valve stem consisting of a member having a chamber, a bearing, a grease inlet to the chamber, a drain outlet from the chamber, and a retainer around the stem between the inlet and the outlet, said retainer having therein a packing member engaging the stem.

13. A bearing support for a valve stem consisting of a member having a chamber, a bearing, a grease inlet to the chamber, a drain outlet from the chamber, a circular trough-shaped retainer engaging the walls of the chamber around the stem, and a packing in the retainer engaging the stem.

14. A bearing support for a valve stem consisting of a member having a chamber, a bearing, a grease inlet to the chamber, a drain outlet from the chamber, a circular trough-shaped retainer engaging the walls of the chamber around the stem, and a strip of leather packing in the retainer engaging the stem.

15. A bearing support for a valve stem consisting of a member having a chamber, a bearing, a grease inlet to the chamber, a drain outlet from the chamber, a circular trough-shaped retainer engaging the walls of the chamber around the stem between the inlet and the outlet, and a strip of leather packing in the retainer engaging the stem.

16. A bearing support for a valve stem consisting of a member having a chamber, a bearing, a grease inlet to the chamber, a drain outlet from the chamber, a circular trough-shaped retainer engaging the walls of the chamber around the stem between the inlet and the outlet, a strip of leather packing in the retainer, and a spring engaging the strip of leather to hold it in the retainer.

17. A bearing support for a valve stem consisting of a member having a chamber, a bearing, a grease inlet to the chamber a drain outlet from the chamber, a circular trough-shaped retainer engaging the walls of the chamber around the stem between the inlet and the outlet, a strip of leather packing in the retainer, and a coil spring engaging the strip of leather to hold it in the retainer.

GEORGE A. BIGGS.